United States Patent [19]

Takida et al.

[11] Patent Number: 5,226,151
[45] Date of Patent: Jul. 6, 1993

[54] EMERGENCY RESUMPTION PROCESSING APPARATUS FOR AN INFORMATION PROCESSING SYSTEM

[75] Inventors: Masatoshi Takida, Tokyo; Atsushi Yoshioka, Kanagawa, both of Japan

[73] Assignee: Fujitsu Limited, Kawasaki, Japan

[21] Appl. No.: 598,257

[22] Filed: Oct. 16, 1990

[30] Foreign Application Priority Data

Oct. 17, 1989 [JP] Japan ................................. 1-270042

[51] Int. Cl.$^5$ ............................................. G06F 11/00
[52] U.S. Cl. ...................................... 395/575; 371/9.1
[58] Field of Search ................... 371/16.3, 9.1, 10.1, 371/62; 395/575; 364/267.9

[56] References Cited

U.S. PATENT DOCUMENTS

| | | | |
|---|---|---|---|
| 4,371,754 | 2/1983 | De et al. | 179/18 EE |
| 4,377,000 | 3/1983 | Staao | 371/11 |
| 4,535,404 | 8/1985 | Shenk | 364/200 |

OTHER PUBLICATIONS

IBM Technical Disclosure Bulletin, vol. 28, No. 10, Mar. 1986, p. 4413; 'Recovery from an Intermediate Microprocessor Operating State' *the whole document*.
IBM Technical Disclosure Bulletin, vol. 28, No. 1 Jun. 1985, pp. 309-311, 'Processor Active Check Scheme'*p. 311, line 27–line 47*.

*Primary Examiner*—Vincent P. Canney

[57] ABSTRACT

An emergency resumption processing apparatus for an information processing system includes a program pattern writing part established within a central processing unit, which writing part writes a program pattern that causes a watchdog timer to provide an overflow action in a loading area of the emergency resumption processing program on the main memory device of the information processing system. An emergency resumption processing program loading part established within the same central processing unit reads the emergency resumption processing program from an external memory device after the writing process has been completed, and loads it on the main memory device by rewriting the program pattern written by the program writing part. As a result, if a fault arises in the transmission function of the emergency resumption processing program and the central processing unit starts to run the program on the main memory device without the emergency resumption processing program being loaded on the main memory device, the watchdog timer never becomes accidentally reset and properly detects a system abnormality, since the program pattern written in the main memory device by the program pattern writing part is run.

7 Claims, 7 Drawing Sheets

| COUNTER VALUE | CENTRAL PROCESSING UNIT | MAIN MEMORY DEVICE | EXTERNAL MEMORY DEVICE | ........ |
|---|---|---|---|---|
| 0 0 | 1 — 0 | 3 — 0 | 4 — 0 | ........ |
| 0 1 | 1 — 0 | 3 — 1 | 4 — 0 | ........ |
| 1 0 | 1 — 1 | 3 — 0 | 4 — 1 | ........ |
| 1 1 | 1 — 1 | 3 — 1 | 4 — 1 | ........ |

Fig. 3

```
JMP ⎵ *+0
JMP ⎵ *+0
   .
   .
   .
JMP ⎵ *+0
```

Fig. 7A

H (400)
```
JMP ⎵ /H(400)
JMP ⎵ /H(400)
   .
   .
   .
JMP ⎵ /H(400)
```

Fig. 7B

EMERGENCY RESUMPTION PROCESSING APPARATUS FOR AN INFORMATION PROCESSING SYSTEM

BACKGROUND OF THE INVENTION

1. Field of the Invention

This invention relates to an emergency resumption processing apparatus for an information processing system, such as an exchange system, whose hardware is multiplexed.

2. Description of the Related Art

In an information processing system such as an exchange system, each piece of system hardware is often multiplexed (generally duplexed). In such a system, operation can be continued by switching to a normal system, even if a fault arises in the system presently used.

If the system changes from an abnormal one to a normal one, the service of the entire system shuts down temporarily while it executes emergency resumption processing, because the new system can begin normal service only after a special processing for emergency resumption has been performed. Service shutdown time should be as short as possible for a highly public information processing system such as an exchange system.

FIG. 1 shows a general configuration of an exchange system, each piece of hardware of which is duplexed.

In FIG. 1, the central processing units 1—0 and 1—1 control the exchange processing of communication information. Switch circuit networks 2—0 and 2—1 switch the communication path of communication lines. Main memory devices 3—0 and 3—1 are for executing an exchange processing program and an emergency resumption processing program. These programs are loaded from an external memory device (later described) at the execution of each program. External memory devices 4—0 and 4—1 memorize the exchange processing program and the emergency resumption processing program. Channel devices 5—0 and 5—1 are interface devices for the main memory devices 3—0 and 3—1 or central processing units 1—0 and 1—1 of the external memory devices 4—0 and 4—1.

FIG. 2 shows a prior art system for switching from an abnormal system to a normal system and for having the latter execute an emergency resumption processing when an abnormality arises in the system currently in use in an exchange system whose configuration is duplexed as shown in FIG. 1. In FIG. 2, configuring elements or processing units other than the central processing units 1—0 and 1—1 of FIG. 1 are omitted. Watchdog timers 11—0 and 11—1 are counters that are counted up by a system clock, not shown in the drawing, and reset by the central processing units 1—0 and 1—1.

Now, a case is considered in which an exchange processing is being executed by a system comprising, e.g., the central processing unit 1—0, the switch circuit network 2—0, the main memory device 3—0, the external memory device 4—0 and the channel device 5—0 shown in FIG. 1. In this case, the central processing unit 1—0 outputs an ACT signal of logical "1" indicating that the system is currently in use, and also periodically resets the watchdog timer 11—0 based on the control of an exchange processing program executed by the same device, which prevents the counter value of the watchdog timer 11—0 from overflowing when the system is in use.

If, for example, an abnormality arises in the main memory device 3—0 (shown in FIG. 1) and the central processing unit 1—0 runs wild, since the central processing unit 1—0 ceases to be capable of normally performing the exchange processing program on the main memory device 3—0, periodic resetting of the watchdog timer 11—0 based on the program ceases to be performed normally. This causes the counter value of the watchdog timer 11—0 to overflow after a predetermined time period has elapsed and to output a carry signal. This carry signal is inputted to an EMA control unit 16 through an "AND" gate 12—0 (the ACT signal remains at the logical "1") and an "OR" gate 15.

Since the central processing unit 1—1 is not in use, it does not output an ACT signal of logical "1". Therefore, even if the counter value of the watchdog timer 11—1 overflows and a carry signal is output, the signal is prevented from being input from "AND" gate 12—1 to the EMA control unit 16. Upon receiving the carry signal from the watchdog timer 11—0, the EMA control unit 16 outputs a pulse signal to an EMA state counter 10 after forcibly resetting the central processing units 1—0 and 1—1. The counter value of the EMA state counter 10 is counted up by the above pulse signal from the EMA control unit 16 and outputted to the central processing units 1—0 and 1—1.

Meanwhile, the central processing units 1—0 and 1—1 have a table as shown in FIG. 3 corresponding to the above counter value. (Numbers in FIG. 3 which are the same as those in FIG. 1 indicate the same configuring elements or processing units.) The central processing unit designated by the above counter value operates in a system shown in the table of FIG. 3 corresponding to its counter value. Thus, as shown above, when a system comprising the central processing unit 1—0, the switch circuit network 2—0, the main memory device 3—0, the external memory device 4—0 and the channel device 5—0 executes an exchange processing, the counter value of the EMA state counter 10 is "00".

Then, as described above, when the watchdog timer 11—0 detects an abnormality in the main memory device 3—0 and the EMA control unit 16 outputs a count-up pulse to the EMA state counter 10, the counter value of the EMA state counter 10 changes from "00" to "01". Hence, the central processing unit 1—0 selects the main memory device 3—1 and external memory device 4—0, according to the table in FIG. 3 corresponding to the counter value "01". The above actions cause the main memory device 3—0 with an abnormality to be switched to the main memory 3—1.

Furthermore, the central processing unit 1—0 loads the program for emergency resumption processing to the switched main memory device 3—1 from the external memory device 4—0. By executing the loaded emergency resumption processing program, the exchange system resumes its service.

A case in which an abnormality arises in the main memory device 3—0 when the system comprising the central processing unit 1—0, the switch circuit network 2—0, the main memory device 3—0, the external memory device 4—0 and the channel device 5—0 executes exchange processing is explained above. When an abnormality arises in the central processing unit 1—0, for example, if he new system shown in FIG. 3 resumes the operation initiated by a change in the counter value of the EMA state counter 10 from "00" to "01", since the central processing unit 1—0 itself runs wild or away, the watchdog timer 11—0 immediately detects an abnormality. Thus, the counter value of the EMA state counter 10 further changes to "10", and the new system comprising central processing unit 1—1 resumes operation. Likewise, no matter what system has an abnormality, by having the counter value of the EMA state counter 10 sequentially change, a normal system automatically resumes operation.

An external watch unit 13 watches the operating mode of the central processing units 1—0 and 1—1 via signal interfaces 14—0 and 14—1, in case the watchdog timers 11—0 and 11—1 cannot detect a system abnormality. The external watch unit 13 outputs a control signal similar to the carry signal described earlier via the "OR" gate 15 to the EMA control unit 16, when it detects a system abnormality. As a result, the system is switched, as when a system abnormality is detected in the watchdog timers 11—0 and 11—1. In this case, the external watch unit 13 detects the system abnormality by tracing the program execution status at the central processing units 1—0 and 1—1. Thus, the detecting interval of the system abnormality requires a relatively long time (in the order of 10 minutes, for example).

In the above described prior art, a fault may arise in the function (including the function of the channel device 5—0 or 5—1) of transmitting the emergency resumption processing program from the external memory device 4—0 or 4—1 to the main memory devices 3—0 or 3—1. If such a fault arises, the program on the main memory device 3—0 or 3—1 can begin to be executed because the central processing unit 1—0 or 1—1 erroneously receives a response indicating a completion of loading from the channel devices 5—0 or 5—1 although the emergency resumption processing program is not loaded on the main memory device 3—0 or 3—1. Of course, because this program execution is not an execution of the emergency resumption processing program, its execution causes the system to run wild. Therefore, if a fault arises in the transmission function of the emergency resumption processing program, a system abnormality is again detected, because the watchdog timer 11—0 or 11—1 ordinarily ceases to be reset at the emergency resumption processing time. Hence, the EMA control unit 16 counts up the counter value of the EMA state counter 10 by one, and requests the central processing units 1—0 or 1—1 to execute the emergency resumption processing again.

However, there is a possibility that the programmed command to reset the watchdog timer 11—0 or 11—1 remaining on the main memory device 3—0 or 3—1 is accidentally executed, because the above described program runs wild. If such a situation happens, the watchdog timer 11—0 or 11—1 cannot detect a system abnormality.

In this case, as discussed earlier, the external watch unit 13 detects the system abnormality. Yet as described earlier, since it takes a long time (about 10 minutes) for the external watch unit 13 to detect the system abnormality, the emergency resumption processing is not reactivated responsively.

Thus, when a fault arises in the transmission function of the emergency resumption processing program, the emergency resumption processing of the exchange system is not executed for a long time, causing a problem that the exchange service is disrupted for a long period.

SUMMARY OF THE INVENTION

An object of the present invention is to shorten the service disruption time accompanying the emergency resumption processing of an information processing system, such as an exchange system, as much as possible.

That is, this invention is premised on an emergency resumption processing apparatus in an information processing system which includes at least a central processing unit, a main memory device and an auxiliary memory device (external memory device). This information processing system may be, for instance, an exchange system whose configuration is duplexed.

First, the emergency resumption processing apparatus has a timer part, which is periodically reset by the information processing program in the currently-used main memory device and is executed by the currently-used central processing unit, for detecting an abnormality of the currently-used system by outputting the overflow of the counter value. This timer part is a watchdog timer, for example, and its counter value overflows when the information processing program in the currently-used main memory device executed by the currently-used central processing unit runs wild.

Secondly, the emergency resumption processing apparatus has a system configuration determination part that determines a new system configuration by selecting a new group of system processing units from the processing units of the multiplexed system of the information processing system, when the timer part outputs an overflow of the counter value.

Thirdly, the emergency resumption processing apparatus has a program pattern writing part, which is provided in each central processing unit, for writing a program pattern that causes the counter value of the timer part to overflow to the loading area of the emergency resumption processing program, on the main memory device selected by the system configuration determination part, when the system configuration determination part selects a central processing unit which includes a program pattern writing part. The program pattern described above contains a program command for repeating a jump to the address in which its own program command is memorized or contains a program command for repeating a jump to a certain address.

Fourth, the emergency resumption processing apparatus has an emergency resumption processing program loading part. This part is provided in each central processing unit for loading the emergency resumption processing program to the area, where the program pattern is written, on the main memory device selected by the system configuration determination part from the auxiliary memory device selected by the system configuration determination part, after the writing actions by the program pattern writing part.

With this configuration, the central processing unit selected by the system configuration determination part executes the program on the main memory device, after receiving a response from its emergency resumption processing program loading part that the emergency resumption processing program is loaded on the main memory device.

Here, when an abnormality arises in the currently-used system configuration, the timer part detects the abnormality as an overflow of the counter value. Based on this abnormality detection, the system configuration determination part determines a new system configuration.

In the new system configuration thus determined, the central processing unit executes the program on the corresponding main memory device, after sequentially activating its own program pattern writing part and the emergency resumption processing program loading part.

In the above action, if the emergency resumption processing program loading part normally loads the emergency resumption processing program to the main memory device from the auxiliary memory device, the central processing unit runs the emergency resumption processing program on the main memory device. Thus, system operation resumes with the system configuration determined by the system configuration determination part.

On the other hand, if an abnormality exists in the emergency resumption processing program loading part so that it cannot normally load the emergency resumption processing program to the main memory 0 device from the auxiliary memory device, the central processing unit begins to run the program on the main memory device, without the emergency resumption program being loaded on the main memory device. In this case, the program pattern already written into the main memory device from the program pattern writing part is executed. As described earlier, this program pattern is the one in which the counter value of the timer part overflows. Accordingly, even if an abnormality such as that described above arises, an incident in which the timer part is reset accidentally does not take place, and the system abnormality is detected by the overflow of the timer part after a short time. Because the system configuration determination part newly determines the other system configuration, a normal emergency resumption processing is executed.

Thus, since this invention can perform a control such that a wild running mode in which the timer part is accidentally reset does not take place, even if a fault arises in the transmission function of the emergency resumption processing program, it can minimize the necessary service disruption time of the information processing system at the emergency resumption processing time.

BRIEF DESCRIPTION OF THE DRAWINGS

Those skilled in the art of the present invention will understand other objectives and features of this invention from the description of the preferred embodiment of this invention as well as from the attached drawing.

FIG. 3 shows an example of a system configuration assigned to the counter value of an EMA state counter;

FIGS. 7A and 7B show examples of program patterns written by the program pattern writing part.

DESCRIPTION OF THE PREFERRED EMBODIMENT

Figure 4:
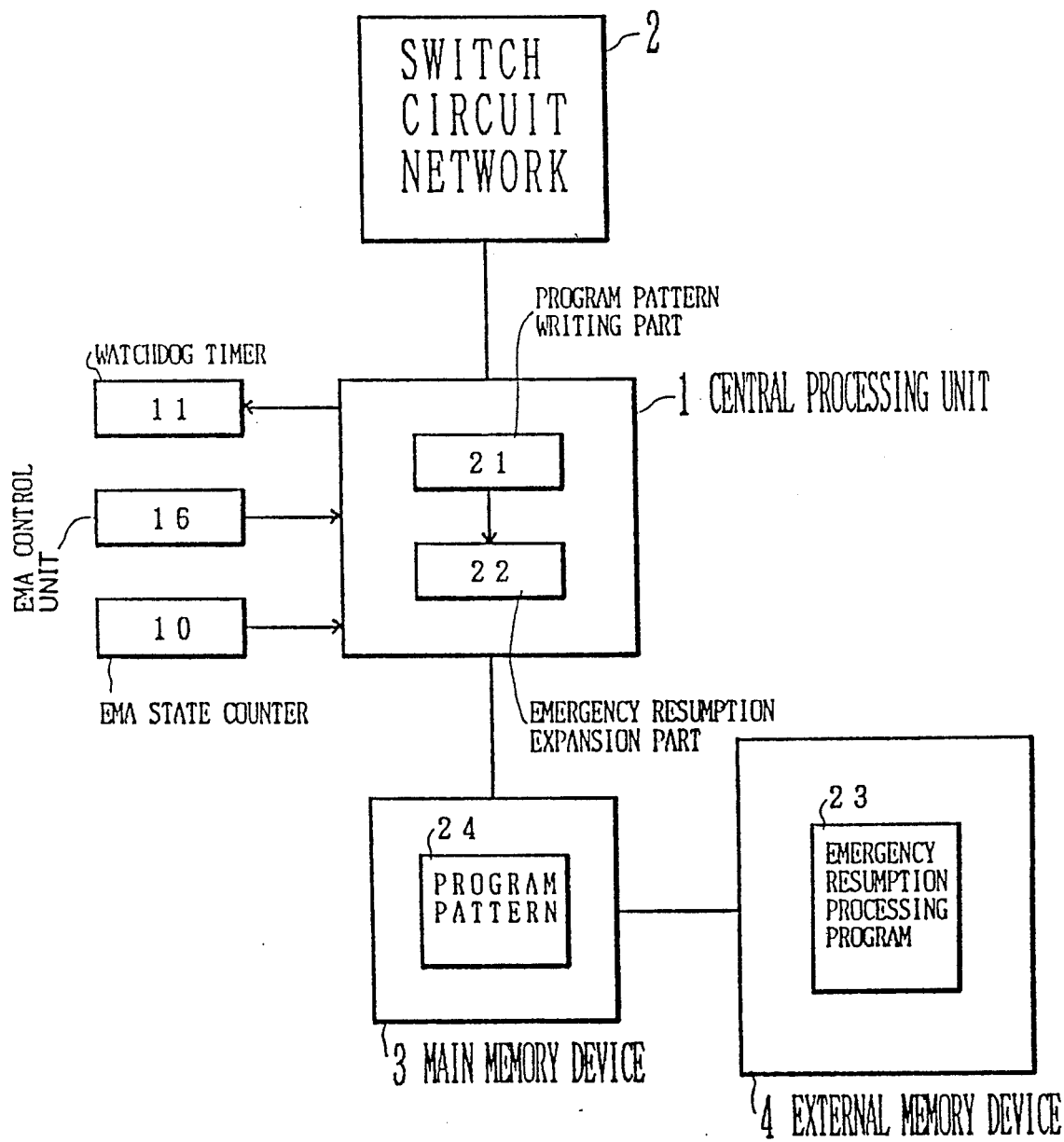
FIG. 4 is a block diagram of a principle configuration of the present invention.

FIG. 4 is a principle block diagram of this invention applied to an exchange system. The basic configuration of the exchange system to which this invention is applied, is similar to the case of FIGS. 1 and 2 described earlier. The system configuration determined by the switching action of the system configuration similar to the prior art described earlier becomes the configuration of an exchange system that executes an emergency resumption processing. This system comprises a central processing unit 1, a switching circuit network 2, a main memory device 3, an external memory device 4, a watchdog timer 11, an EMA control unit 16 and an EMA state counter 10.

Figure 1:
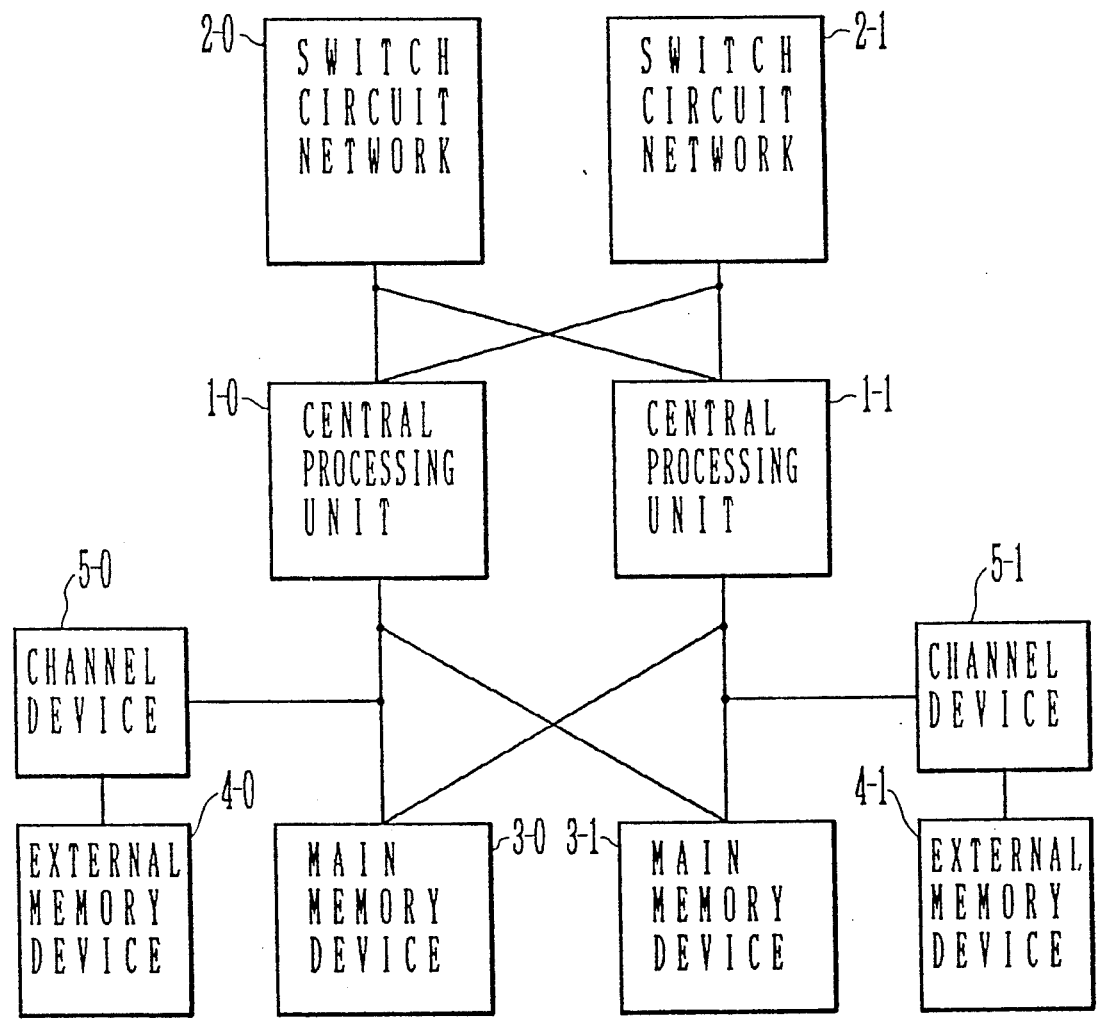
FIG. 1 is a block diagram showing a configuration of a duplexed exchange system.
Figure 2:
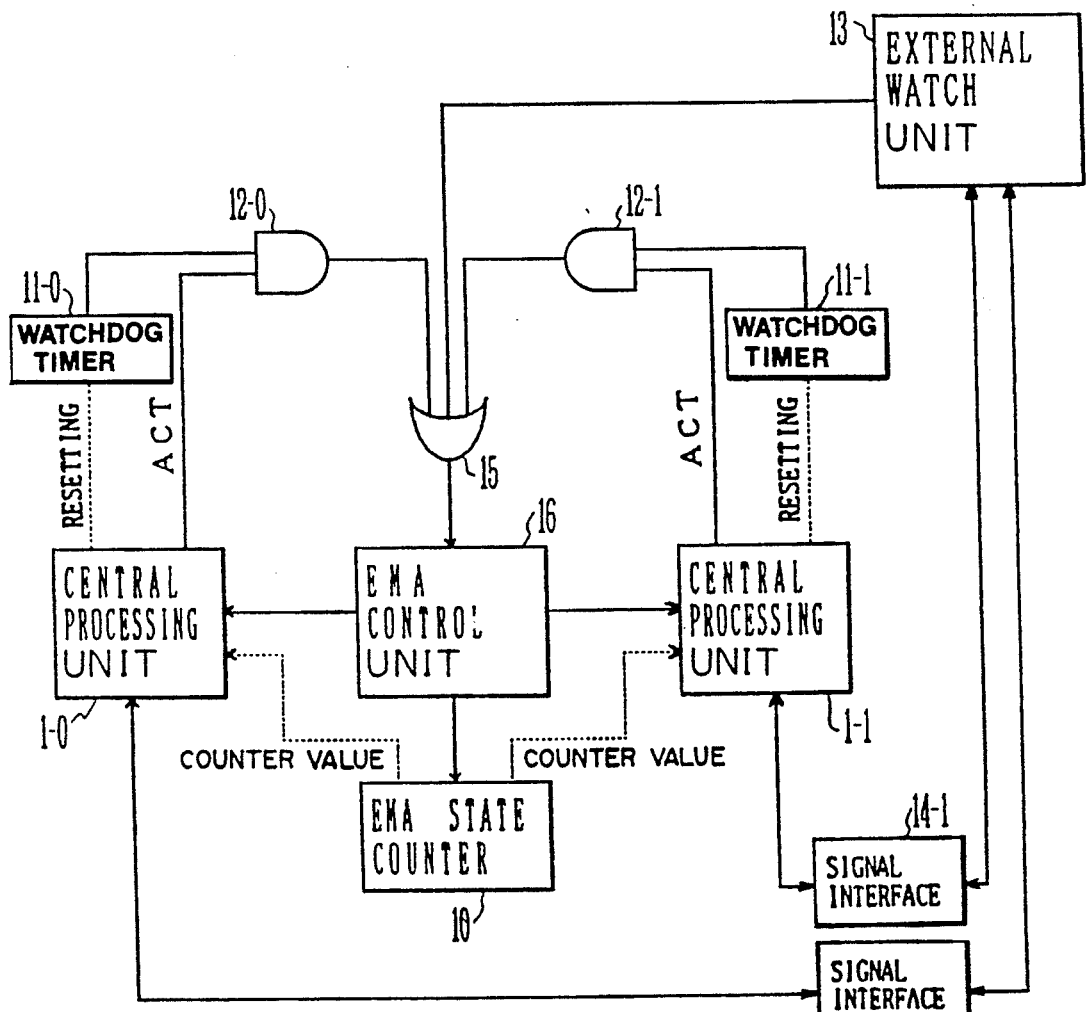
FIG. 2 is a block diagram showing a configuration of the system of the prior art.

The configuration shown in FIG. 4 has the following features in addition to the configuration shown in FIGS. 1 and 2.

In FIG. 4, a program pattern writing part 21 established within the central processing unit 1 is configured by a microprogram, its execution circuit, etc. The program pattern writing part 21 writes the program pattern 24, which causes the watchdog timer 11 to make an overflow action, in the loading area of the emergency resumption processing program on the main memory device 3.

The emergency resumption processing program loading part 22 established within the central processing unit 1 is configured by a microprogram, its execution circuit, etc., after the program pattern writing part 21 consummates its writing processing, reads an emergency resumption processing program 23 from the external memory device 4, and loads it on the main memory device 3 by rewriting the program pattern 24 written by the program pattern writing part 21.

In the above configuration, when the EMA control unit 16 resets the central processing unit 1, before the loading of the emergency resumption processing program 23, the program pattern writing part 21 writes the program pattern 24, that causes the watchdog timer 11 to make an overflow action, in the loading area of the emergency resumption processing program on the main memory device 3. This program pattern 24 repeats a jump to a specified address.

After the program pattern writing part 21 consummates the above writing processing, the emergency resumption program loading part 22 of the central processing unit 1 reads out the emergency resumption processing program 23 from the external memory device 4 and loads it to the main memory device 3 so that it overwrites the program pattern 24 already written on the main memory device 3.

As a result, when the central processing unit 1 starts to run the program on the main memory device 3 without the emergency resumption processing program 23 being loaded on the main memory device 3, because a fault arises in the transmission function of the emergency resumption processing program 23, the program pattern 24 already written into the main memory device 3 by the program pattern writing part 21 runs. Consequently, such an incident when the watchdog timer 11 accidentally becomes reset does not occur, and a system abnormality is detected by the overflow of the watchdog timer 11 after a short time. Thus, since the EMA state counter 10 is counted up via the EMA control unit 1 6 and another system configuration is newly determined, a normal emergency resumption processing is executed.

Accordingly, because control is made so that an uncontrollable state of the watchdog timer 11 which may become accidentally reset does not arise even if a fault takes place in the transmission function of the emergency resumption processing program 23, the service disruption time of an exchange system at an emergency resumption processing time is held to a minimum.

Figure 5:
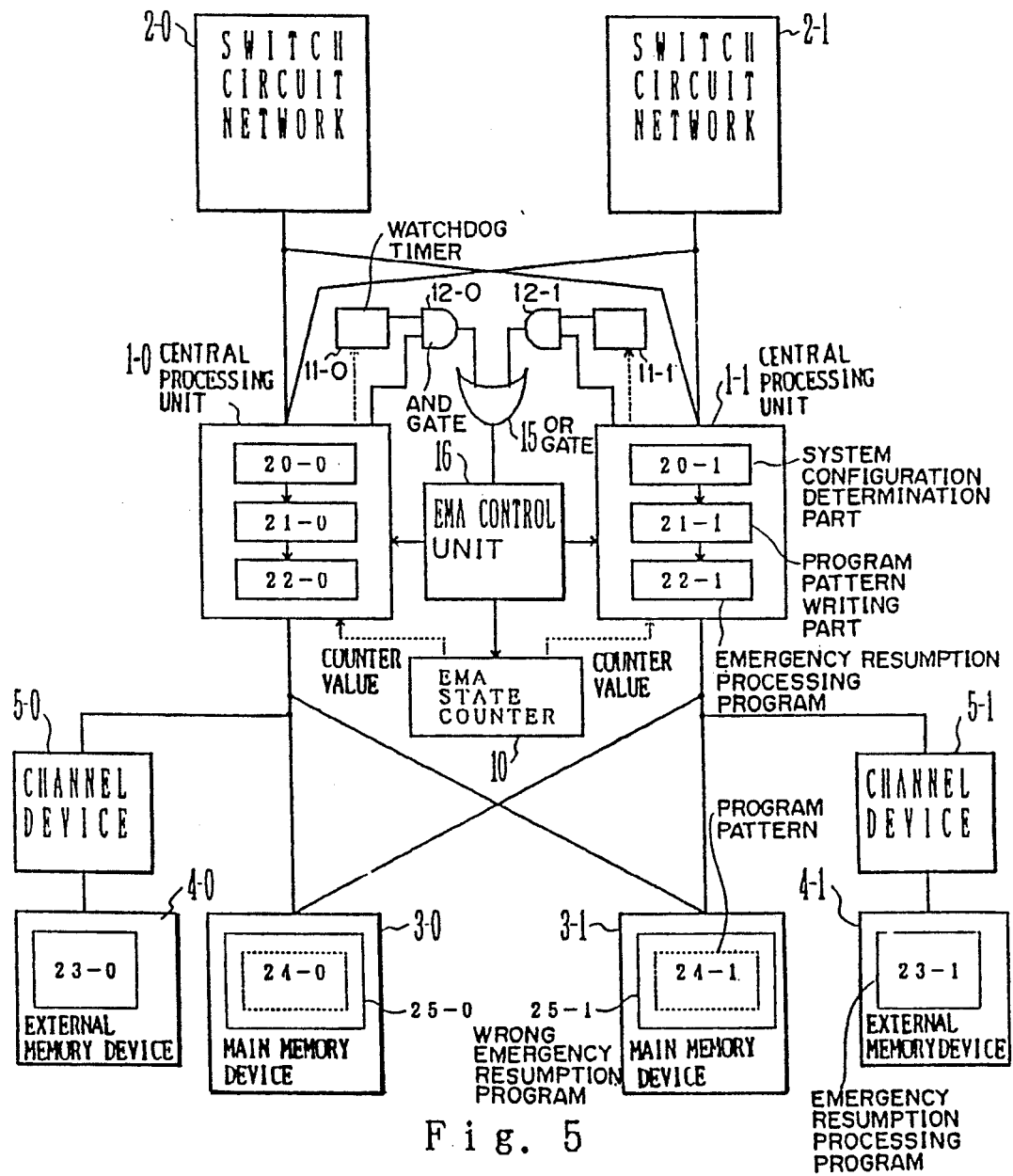
FIG. 5 is a block diagram of a system of preferred embodiment of the present invention.

FIG. 5 shows the preferred embodiment of this invention.

Reference numerals shown in FIG. 5 which are the same as those in FIGS. 1 and 2 indicate the same configuring elements.

When reset by the EMA control unit 16, a system configuration determination part 20—0 or 20—1 in the central processing unit 1—0 or 1—1 determines the system configuration that executes an emergency resumption processing according to the counter value of the EMA state counter 10. Therefore, the system determination parts utilize a table such as that shown in FIG. 3. The action that determines the system configuration is the same as explained above in connection with FIG. 3. In the following explanation, the number of the respective configuring element determined as a new system configuring element is designated with an extension "-i". For example, the central processing unit is designated "1-$i$".

The program pattern writing part 21-$i$ in the central processing unit 1-$i$ is determined as the device for executing emergency resumption processing. It writes a program pattern 24-$i$, that causes a watchdog timer 11-$i$ to make an overflow action, in the loading area of the emergency resumption processing program on the main memory device 3-$i$ determined as an executing device of the emergency resumption processing. The program pattern 24-$i$ is memorized, e.g., in a ROM or the like, not shown in the drawing, within the program pattern writing part 21-$i$.

After the program pattern writing part 21-$i$ completes its writing processing, the emergency resumption processing program loading part 22-$i$ within the central processing unit 1-$i$ determined as a device for executing the emergency resumption processing. It loads an emergency resumption processing program 23-$i$ to the main memory device 3—1 determined as a device for executing emergency resumption processing from the external memory device 4-$i$ determined as a device for executing the emergency resumption processing.

The system configuration determination parts 20—0 and 20—1, the program pattern writing parts 21—0 and 21—1, and the emergency resumption processing program loading parts 22—0 and 22—1, all established in the above described central processing unit 1—0 and 1—1, are realized with a microprogram and pieces of hardware such as a circuit for executing the microprogram.

In the preferred embodiment shown in FIG. 5, the external watch unit 13 and the signal interfaces 14—0 and 14—1 explained in FIG. 2 are omitted because they are not particularly related to this invention.

Figure 6:
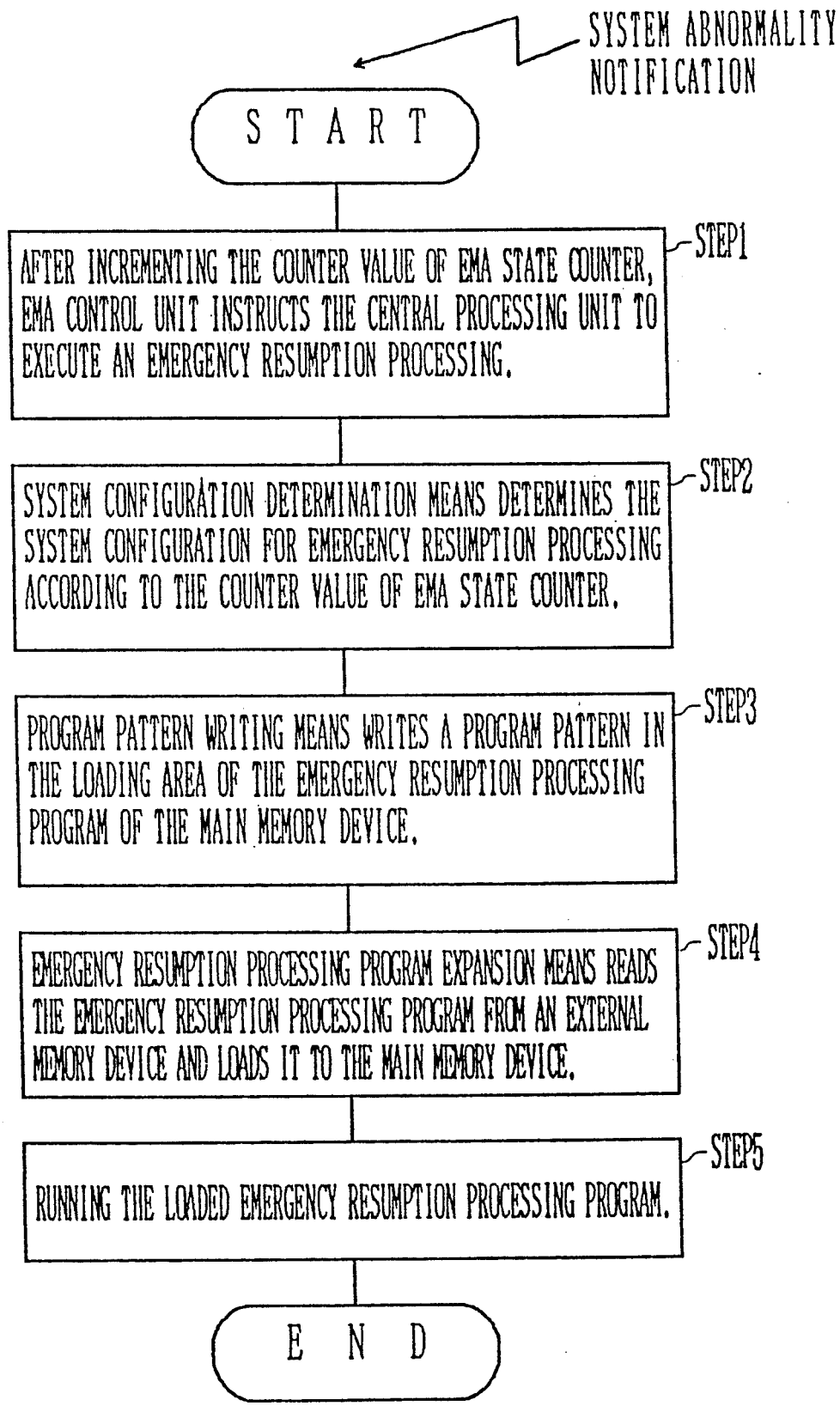
FIG. 6 is an operational flow chart of the embodiment of FIG. 5.

The operation of the preferred embodiment shown in FIG. 5 are explained by following the operation flow chart shown in FIG. 6. The operation steps shown in this flow chart are realized by the interrelated action of configuring element in FIG. 5. For the sake of explanation, the number of each configuring element in the system configuration initially in use is designated with an extension "-$j$". For instance, the central processing unit is "1-$j$".

If a reset from the currently-used central processing unit 1-$j$ to a watchdog timer 11-$j$ is not executed, e.g., the reset due to the exchange processing program running wild, the watchdog timer 11-$j$ overflows similarly to the prior art. Thus, the EMA control unit 16 is notified of an occurrence of a system abnormality via the "AND" gate 12-$j$ and the "OR" gate 15. Upon receipt of this notice, the EMA control unit 16 counts up the counter value of the EMA state counter 10 by outputting a pulse signal to it, and resets the central processing units 1—0 and 1—1 (Step 1 in FIG. 6).

In the central processing unit 1-$i$ designated to operate by the counter value from the EMA state counter 10 (Refer to FIG. 3.), when the EMA control unit 16 resets the above actions, by referring to the table within the configuration determination part 20-$i$ exemplarily shown in FIG. 3 by the counter value from the EMA state counter 1 0, the system configuration determination part 20-$i$ determines the system configuration for executing the emergency resumption processing and connects each configuring element. That is, the system configuration determination part 20-$i$, determines the switch circuit network 2-$i$ the main memory device 3-$i$, the external memory device 4-$i$, the channel device 5-$i$ and the like, for executing emergency resumption processing, and connects them to itself, i.e., the central processing unit 1-$i$ (Step 2 in FIG. 6).

Next, the program pattern writing part 21-$i$ within the central processing unit 1-$i$, determined as the executing side of the emergency resumption processing, writes the program pattern 24-$i$. This causes the watchdog timer 11-$i$ to make an overflow action in the loading area of the emergency resumption processing program of the main memory device 3-$i$ determined as a device for executing the emergency resumption processing (Step 3 in FIG. 6). This program pattern is the one that repeats a jump to the address of itself as shown in FIG. 7A or the one that repeats a jump to a specified address as shown in FIG. 7B.

Then, the emergency resumption processing program loading part 22-$i$ within the central processing unit 1-$i$ determined as a device for executing the emergency resumption processing reads out the emergency resumption processing program 23-$i$ from the external memory device 4-$i$ determined as a device for executing the emergency resumption processing and loads it on the main memory device 3-$i$, so that it overwrites the program pattern 24-$i$ described above (Step 4 in FIG. 6).

Furthermore, the central processing unit 1-i, determined as a device for executing of the emergency resumption processing, executes the emergency resumption processing by running the loaded emergency resumption processing program 23-$i$ described above, in similar manner to the prior art (Step 5 in FIG. 6). After execution of the emergency resumption processing, the system configuration determined by the system configuration determination part 20-$i$ resumes the exchange processing.

In this manner, by executing a writing of the program pattern 24-$i$ prior to the loading of the emergency resumption program 23-$i$, even if a fault arises in the transmission function of the emergency resumption processing program and the emergency resumption processing program 23-$i$ is not loaded on the main memory device 3-$i$, since the central processing unit 1-$i$ runs the program pattern 24-i, watchdog timer 11-i is not accidentally reset. Consequently, the watchdog timer 11-i immediately detects a system abnormality. Therefore, the EMA control unit 16 can reset the central processing units 1—0 and 1—1 in a short period of time without relying on the external watch unit 13 as in the prior art, and the corresponding central processing unit 1-i can immediately switch to a new system configuration, based on which a normal emergency resumption processing is executed.

In the preferred embodiment described above, there is a possibility of a fault occurring in the transmission of the program pattern 24-i itself from the central processing unit 1-i to the main memory device 3-i. Such a case can occur when the data access from the central processing unit 1-i to the main memory device 3-i fails or when the central processing unit 1-i cannot access the main memory device 3-i due to a fault in the central processing unit 1-i itself. In either case, since the central processing unit 1-i cannot reset the watchdog timer 11-i by the instruction from the program on the main memory device 3-i, the watchdog timer 11-i detects a system abnormality even without employing the art of this invention.

Although in the preferred embodiment described above the program pattern 24-i is made to be written only in the loading area of the emergency resumption processing program on the main memory device 3-i, determined as a device for executing the emergency resumption processing, this writing area can be extended to other than the above described loading area. If this is done, even if a wrong emergency resumption program 25-i (refer to FIG. 5) different from the authentic emergency processing program 23-i is loaded and the wrong emergency resumption processing program 25-i causes the central processing unit 1-i to run wild, since the watchdog timer 11-i overflows based on the program pattern 24-i written in the extended area, actions similar to the case of the preferred embodiment described earlier are realized.

The program pattern 24-i is not limited to those shown in FIGS. 7A and 7B. Instead, it can be any program pattern, as long as it generates an overflow in the watchdog timer 11-i.

The application of this invention is by no means limited to an exchange system. This invention can also be applied to an information processing system that process sundry information.

Furthermore, the system configuration is not limited to a duplexed configuration, but can also be multiplexed more than twice.

What is claimed is:

1. An emergency resumption processing apparatus in combination with an information processing system including a plurality of processing units each including a central processing means, a main memory device and an auxiliary memory device, wherein the processing units are multiplexed, said apparatus comprising:

a timer means for outputting a counter value and being periodically reset by an information processing program on the main memory device being in use executed by the central processing means being in use, for detecting an abnormality in a currently-used system configuration by outputting an overflow of the counter value;

a system configuration determination means for determining a new system configuration by selecting a new group of system processing units from said multiplexed processing units of said information processing system, when said timer means outputs an overflow of the counter value;

a program pattern writing means, provided in said central processing means, for writing a program pattern causing the counter value of said timer means to overflow to a loading area of an emergency resumption processing program on a main memory device selected by said system configuration determination means, when said system configuration determination means selects the central processing means containing the program writing means; and an emergency resumption processing program loading means, provided in said central processing means, for loading an emergency resumption processing program to a region where said program pattern is written, on said main memory device selected by said system configuration determination means after said program pattern writing means has written the program pattern;

said central processing means, which is selected by said system configuration determination means, executing the program on said main memory device after receiving from said emergency resumption processing program loading means, a response designating that said emergency resumption processing program has been loaded on said main memory device.

2. The emergency resumption processing apparatus according to claim 1, wherein
said information processing system includes an exchange system comprising a duplexed configuration in which each system configuring element including the central processing means, the main memory device, the auxiliary memory device and a switch circuit network for switching the communication line controlled by said central processing means.

3. The emergency resumption processing apparatus according to claim 1, wherein
the overflow of the counter value of said timer means overflows when the information processing program on the currently-used main memory device, executed by the currently-used central processing means, runs away.

4. The emergency resumption processing apparatus according to claim 1, wherein
said timer means comprises a watchdog timer.

5. The emergency resumption processing apparatus according to claim 1, wherein
said program pattern contains a program command for repeating a jump to an address where its own program command is memorized.

6. The emergency resumption processing apparatus according to claim 1, wherein
said program pattern contains a program command for repeating a jump to a specified address.

7. An emergency resumption processing apparatus in combination with an information processing system including processing units each including a central processing means, a main memory device and an auxiliary memory device, wherein the processing units are multiplexed, said apparatus comprising:

a timer means for outputting a counter value and being periodically reset by a currently-used program on the main memory device executed by a currently-used central processing means, for detecting an abnormality of a currently-used system configuration by outputting an overflow of the counter value;

an EMA state counter counting each time said timer means outputs the overflow of the counter value;

a system configuration determination means, provided in said central processing means and containing a table indicating a group of the processing units selected by each of the counter values output by said EMA state counter, for determining a new system configuration by connecting each of said processing units corresponding to the content of said table with the central processing means containing said system configuration determination means, when said counter value outputted from said EMA state counter selects a central processing means containing said system configuration determination means according to the content of said table;

a program pattern writing means, provided in said central processing means, for writing a program pattern causing the counter value of said timer means to overflow to a loading area of an emergency resumption processing program on a main memory device selected by said system configuration determination means, when said system configuration determination means selects the central processing unit containing said program pattern writing part; and an emergency resumption processing program loading means, provided in said central processing program to a region, where said program pattern is written, on said main memory device selected by said system configuration determination means, from an auxiliary memory device selected by said system configuration determination means, after said program pattern writing means has written the program pattern;

said central processing means, which is selected by said system configuration determination means, executing the program on said main memory device, after receiving, from said emergency resumption processing program loading means, a response designating that said emergency resumption processing program is loaded on said main memory device.

* * * * *